(12) United States Patent
Tan et al.

(10) Patent No.: US 10,843,767 B2
(45) Date of Patent: Nov. 24, 2020

(54) DUAL PEDAL-DRIVEN SCOOTER

(71) Applicant: Shanghai Changyi Machinery Manufacture Co., Ltd, Shanghai (CN)

(72) Inventors: Junrong Tan, Shanghai (CN); Bang Chen, Shanghai (CN)

(73) Assignee: City University of Hong Kong, Kowloon (HK)

( * ) Notice: Subject to any disclaimer, the term of this patent is extended or adjusted under 35 U.S.C. 154(b) by 267 days.

(21) Appl. No.: 15/996,823

(22) Filed: Jun. 4, 2018

(65) Prior Publication Data

US 2018/0346061 A1  Dec. 6, 2018

(30) Foreign Application Priority Data

Jun. 5, 2017 (CN) ............... 2017 2 0642436 U

(51) Int. Cl.
| | |
|---|---|
| *B62M 1/28* | (2013.01) |
| *B62K 3/00* | (2006.01) |
| *B62M 1/10* | (2010.01) |
| *B62K 21/02* | (2006.01) |
| *B62M 9/02* | (2006.01) |
| *B62M 9/16* | (2006.01) |
| *B62M 11/02* | (2006.01) |

(52) U.S. Cl.
CPC ............. *B62M 1/28* (2013.01); *B62K 3/002* (2013.01); *B62K 21/02* (2013.01); *B62M 1/10* (2013.01); *B62M 9/02* (2013.01); *B62M 9/16* (2013.01); *B62M 11/02* (2013.01)

(58) Field of Classification Search
CPC . B62M 1/10; B62M 1/24; B62M 1/26; B62M 1/28; B62K 3/022
See application file for complete search history.

(56) References Cited

U.S. PATENT DOCUMENTS

| | | | | | |
|---|---|---|---|---|---|
| 1,014,279 | A | * | 1/1912 | Auger ..................... | B62M 1/26 280/221 |
| 1,653,889 | A | * | 12/1927 | Clark ....................... | B62M 1/28 280/221 |
| 2,283,506 | A | * | 5/1942 | Moncada ................. | B62M 1/24 74/136 |
| 2,630,333 | A | * | 3/1953 | Petersen .................. | B62M 1/28 280/255 |
| 3,039,790 | A | * | 6/1962 | Trott ....................... | B62M 1/28 280/251 |
| 3,820,820 | A | * | 6/1974 | Kutz ....................... | B62M 1/24 280/252 |

(Continued)

*Primary Examiner* — Ruth Ilan
*Assistant Examiner* — Conan D Duda
(74) *Attorney, Agent, or Firm* — Renner Kenner Greive Bobak Taylor & Weber

(57) ABSTRACT

A dual pedal driven scooter includes a frame with a front end and a rear end; a front wheel and a rear wheel connected to the frame at the front end and the rear end, respectively; a driving mechanism configured to drive the rear wheel to in turn drive the scooter; and a pedal configured to drive the scooter; wherein the driving mechanism has a driving linkage that links the pedal and the rear wheel, and the pedal is fixedly connected with the driving linkage so as to drive the rear wheel by pulling the driving linkage. The invention is more comfortable and safe to use, and not only is suitable for both playing and fitness but also suitable for a short-distance walk.

13 Claims, 4 Drawing Sheets

(56) References Cited

U.S. PATENT DOCUMENTS

| | | | | |
|---|---|---|---|---|
| 3,834,733 A * | 9/1974 | Harris | B62M 1/28 | 280/251 |
| 3,888,512 A * | 6/1975 | Peterson | B62M 1/28 | 280/255 |
| 3,939,719 A * | 2/1976 | Stovall | B62M 1/28 | 74/128 |
| 4,186,934 A * | 2/1980 | Collings | B62H 1/12 | 280/221 |
| 4,379,566 A * | 4/1983 | Titcomb | B62K 21/18 | 280/251 |
| 4,445,701 A * | 5/1984 | Stroud | B62M 1/10 | 280/217 |
| 4,574,649 A * | 3/1986 | Seol | B62M 1/28 | 192/28 |
| 4,630,839 A * | 12/1986 | Seol | B62M 1/28 | 280/255 |
| 4,779,863 A * | 10/1988 | Yang | B62M 1/30 | 482/51 |
| 4,828,284 A * | 5/1989 | Sandgren | B62K 3/002 | 280/221 |
| 4,846,488 A * | 7/1989 | Szadkowski | B62M 1/28 | 280/221 |
| 5,156,412 A * | 10/1992 | Meguerditchian | B62M 1/28 | 280/241 |
| 5,192,089 A * | 3/1993 | Taylor | B62K 3/002 | 280/221 |
| 5,236,211 A * | 8/1993 | Meguerditchian | B62M 1/28 | 280/241 |
| 5,335,927 A * | 8/1994 | Islas | B62M 1/28 | 280/254 |
| 5,368,321 A * | 11/1994 | Berman | B62K 3/002 | 280/221 |
| 5,451,070 A * | 9/1995 | Lindsay | B62M 1/28 | 192/71 |
| 5,520,401 A * | 5/1996 | Mohseni | B62K 3/002 | 280/221 |
| 5,591,107 A * | 1/1997 | Rodgers, Jr. | A63B 71/0622 | 482/51 |
| 5,690,346 A * | 11/1997 | Keskitalo | B62K 3/005 | 280/234 |
| 5,876,053 A * | 3/1999 | Ray | B62M 1/24 | 280/252 |
| 5,915,710 A * | 6/1999 | Miller | B62K 3/005 | 280/252 |
| 5,988,662 A * | 11/1999 | Staehlin | B62M 1/28 | 280/251 |
| 6,113,510 A * | 9/2000 | Farmos | B62M 1/28 | 280/252 |
| 6,123,635 A * | 9/2000 | Farmos | B62M 1/28 | 280/252 |
| 6,123,636 A * | 9/2000 | Farmos | B62M 1/28 | 280/252 |
| 6,129,646 A * | 10/2000 | Farmos | B62M 1/24 | 280/241 |
| 6,237,928 B1 * | 5/2001 | Islas | B62M 1/24 | 280/252 |
| 6,402,173 B1 * | 6/2002 | Chiu | B62M 1/28 | 280/252 |
| 6,485,041 B1 * | 11/2002 | Janssen | B62K 3/002 | 280/221 |
| 7,111,860 B1 * | 9/2006 | Grimaldos | B62K 3/002 | 280/221 |
| 7,967,313 B1 * | 6/2011 | Eggert | B62K 5/02 | 280/224 |
| 8,215,654 B1 * | 7/2012 | Leser | B62M 1/28 | 280/241 |
| 8,944,452 B1 * | 2/2015 | Scolari | B62K 3/002 | 280/221 |
| 2002/0006852 A1 * | 1/2002 | Salgado | B62M 1/24 | 482/57 |
| 2002/0093171 A1 * | 7/2002 | Chen | B62K 3/002 | 280/253 |
| 2002/0105160 A1 * | 8/2002 | Yen | B62K 3/002 | 280/252 |
| 2002/0163159 A1 * | 11/2002 | Christensen | B62M 1/30 | 280/252 |
| 2002/0173409 A1 * | 11/2002 | Bhoopathy | B62K 3/002 | 482/57 |
| 2003/0020254 A1 * | 1/2003 | Weaver, II | B62M 1/24 | 280/252 |
| 2003/0042059 A1 * | 3/2003 | Tsai | B62K 3/002 | 180/181 |
| 2003/0098566 A1 * | 5/2003 | Christensen | B62K 3/002 | 280/221 |
| 2003/0173755 A1 * | 9/2003 | Lachenmayer | B62M 1/28 | 280/252 |
| 2003/0176247 A1 * | 9/2003 | Gottschalk | B62M 1/28 | 474/53 |
| 2003/0193159 A1 * | 10/2003 | Ridenhour | B62K 3/002 | 280/255 |
| 2004/0018919 A1 * | 1/2004 | Chen | A63B 22/20 | 482/57 |
| 2005/0046269 A1 * | 3/2005 | Sepulveda | B62M 1/28 | 301/54 |
| 2005/0098977 A1 * | 5/2005 | Paquette | B62M 1/28 | 280/252 |
| 2005/0236801 A1 * | 10/2005 | Tal | B62M 1/32 | 280/221 |
| 2005/0253355 A1 * | 11/2005 | Nacer | B62M 23/02 | 280/252 |
| 2006/0046884 A1 * | 3/2006 | Estergomy | B62K 3/005 | 474/205 |
| 2006/0066072 A1 * | 3/2006 | Scarborough | B62M 1/32 | 280/253 |
| 2006/0103105 A1 * | 5/2006 | Fan | B62M 1/28 | 280/221 |
| 2006/0119052 A1 * | 6/2006 | Bauce | B62K 3/002 | 280/8 |
| 2006/0181050 A1 * | 8/2006 | Moreno | B62K 3/002 | 280/221 |
| 2007/0114749 A1 * | 5/2007 | Tal | B62M 1/28 | 280/221 |
| 2008/0096708 A1 * | 4/2008 | Meguerditchian | B62M 1/24 | 474/148 |
| 2008/0106061 A1 * | 5/2008 | Meguerditchian | B62K 3/002 | 280/253 |
| 2008/0146390 A1 * | 6/2008 | Lacreu | F16H 19/0659 | 474/68 |
| 2008/0271551 A1 * | 11/2008 | Meguerditchian | F16H 31/001 | 74/37 |
| 2009/0134597 A1 * | 5/2009 | Buchberger | B62M 1/28 | 280/251 |
| 2009/0174169 A1 * | 7/2009 | Polyakov | B62M 1/24 | 280/259 |
| 2009/0261552 A1 * | 10/2009 | McIsaac | B62M 1/24 | 280/255 |
| 2009/0273155 A1 * | 11/2009 | Fan | B62K 3/002 | 280/230 |
| 2009/0295118 A1 * | 12/2009 | Scarborough | B62K 3/10 | 280/216 |
| 2009/0315294 A1 * | 12/2009 | Conti | B62K 3/002 | 280/221 |
| 2010/0187790 A1 * | 7/2010 | Yu | B62M 1/28 | 280/221 |
| 2010/0320718 A1 * | 12/2010 | Buchberger | F16H 19/0659 | 280/221 |
| 2011/0057411 A1 * | 3/2011 | Scolari | B62M 1/26 | 280/221 |
| 2011/0057412 A1 * | 3/2011 | Owoc | B62K 3/002 | 280/257 |
| 2011/0187073 A1 * | 8/2011 | Fan | B62M 1/28 | 280/221 |
| 2011/0193311 A1 * | 8/2011 | Chou | B62M 1/30 | 280/221 |
| 2011/0266768 A1 * | 11/2011 | Kohlheb | B62M 1/26 | 280/251 |
| 2011/0275484 A1 * | 11/2011 | Beard | B62K 3/002 | 482/51 |

(56) References Cited

U.S. PATENT DOCUMENTS

| | | | |
|---|---|---|---|
| 2012/0048059 A1* | 3/2012 | Sun | B62K 3/002 |
| | | | 74/594.4 |
| 2012/0061942 A1* | 3/2012 | Kulikov | B62K 15/00 |
| | | | 280/287 |
| 2012/0086182 A1* | 4/2012 | Scarborough | B62M 1/28 |
| | | | 280/257 |
| 2014/0210179 A1* | 7/2014 | Sprague | B62M 1/26 |
| | | | 280/261 |
| 2015/0217832 A1* | 8/2015 | Kataoka | B62M 1/28 |
| | | | 280/228 |
| 2015/0344102 A1* | 12/2015 | Pastilha | B62M 9/04 |
| | | | 280/221 |
| 2017/0313375 A1* | 11/2017 | Lee | B62K 5/10 |
| 2017/0341703 A1* | 11/2017 | Liao | B62K 3/002 |
| 2018/0050231 A1* | 2/2018 | Teal | A63B 22/0664 |
| 2018/0065706 A1* | 3/2018 | Teal | B62M 1/26 |
| 2018/0127052 A1* | 5/2018 | Scarborough | B62M 1/28 |
| 2018/0290708 A1* | 10/2018 | Liao | B62M 1/30 |
| 2018/0346060 A1* | 12/2018 | Hunker | B62K 3/002 |
| 2018/0346061 A1* | 12/2018 | Tan | B62M 1/28 |
| 2019/0023349 A1* | 1/2019 | Luo | B62K 3/002 |
| 2019/0113086 A1* | 4/2019 | Rosser | F16D 41/28 |
| 2019/0168840 A1* | 6/2019 | Ruz Campos | A63B 23/04 |
| 2019/0210689 A1* | 7/2019 | Hong | B62M 1/28 |
| 2019/0344854 A1* | 11/2019 | Lewis | B62M 1/26 |
| 2019/0359283 A1* | 11/2019 | Rosser | F16D 27/01 |
| 2019/0389534 A1* | 12/2019 | Scarborough | B62M 1/30 |

\* cited by examiner

DUAL PEDAL-DRIVEN SCOOTER

FIELD OF THE DISCLOSURE

The invention relates to a scooter, in particular to a dual pedal-powered scooter with dual pedals on two sides of a vehicle body driven by two pedals distributed and driven forward by alternately pedaling the user's feet to the left and right.

BACKGROUND

Scooters can be used as simple transportation, which have the advantages of light weight, simple structure, easy to collect and the like. Traditionally simpler scooters can be propelled forward in a manner similar to propelling skateboards, where the user can stand on the pedal of scooters on one foot and propel the scooters with the other foot.

More novel scooters may include a transmission so that the user can use the alternate movement of the center of gravity to provide the scooters with kinetic energy to propel the scooters forward.

SUMMARY

The technical problem solved by the present invention is to provide a scooter which has a simple structure, light weight, and the weight-applying foot on the pedals of the scooter can be switched in any position. The user's comfort and safety can be greatly improved.

In order to solve the above technical problems, in accordance with the first aspect, the present invention provides a scooter comprising: a frame with a front end and a rear end; a front wheel and a rear wheel connected to the frame at the front end and the rear end, respectively; a driving mechanism configured to drive the rear wheel to in turn drive the scooter; and at least one pedal configured to drive the scooter; characterized in that the driving mechanism has a driving linkage that links the pedal and the rear wheel, and the pedal is fixedly connected with the driving linkage so as to drive the rear wheel by pulling the driving linkage.

Preferably, the driving linkage is provided with at least one connecting point fixedly connected to the pedal.

Preferably, the driving mechanism is fixedly connected to or in proximity to the rear end of the frame.

Preferably, the scooter is comprises a left and a right pedals located at both sides of the frame respectively, wherein the driving mechanism is provided between the left pedal and the right pedal.

Preferably, the driving mechanism further comprises a one-way transmission assembly linked by the driving linkage, which is configured to rotate unidirectionally with respect to the rear wheel.

Preferably, the one-way transmission assembly includes a one-way bearing and/or a ratchet.

Preferably, the driving mechanism further has a runner assembly, the driving linkage is configured to loop around the runner assembly.

Preferably, the runner assembly comprises: a first flywheel and a second flywheel provided on the wheel axle of the rear wheel and configured to link the rear wheel; a first runner set and a second runner set; wherein the driving linkage is configured to sequentially loop around the first runner set, the first flywheel, the second runner set, and the second flywheel and then return to the first runner set.

Preferably, each of the first and second runner assemblies consists of one or more sprockets, flywheels or pulleys.

Preferably, the driving mechanism further comprises an elastic member configured to tension the driving linkage.

In accordance with a second aspect, the present invention also provides a dual pedal driven scooter. The scooter comprises a frame connected to a left pedal and a right pedal, a first runner assembly and a second runner assembly are connected to the frame, and a driving linkage is sequentially looped around a first runner assembly, a first flywheel, and a second runner assembly and a second flywheel, and then back to the first runner assembly, the driving linkage is connected to the left pedal, the driving linkage is connected to the right pedal, and a rear wheel is connected to a rear end of the frame, and a faucet tube is connected to the front end of the frame, the faucet tube is sleeved with the front fork, and an upper end of the front fork is connected to the crossbar by a standpipe, and a lower end of the front fork is connected to the front wheel.

Preferably, the left pedal and the right pedal are located on both sides of the frame, respectively.

Preferably, each of the left pedal and the right pedal are connected to the frame by a pedal shaft.

Preferably, the driving linkage is composed of an elastic rope and/or a chain.

Preferably, the connecting point between the driving linkage and the left pedal is located between the first flywheel and the second runner set.

Preferably, the connecting point of the driving linkage and the right pedal is located between the second flywheel and the second runner assembly.

Preferably, the first flywheel and the second flywheel are both provided on the wheel axle, and the wheel axle is provided on the rear wheel.

Preferably, the first flywheel and the second flywheel both rotate unidirectionally with respect to the wheel axle.

Preferably, the first flywheel and the second flywheel are further arranged to rotate in opposite directions with respect to each other.

Preferably, the rear part of the frame is provided with a first runner assembly and a second runner assembly.

Preferably, the first runner assembly and the second runner assembly consist of one or more runners.

The first flywheel and the second flywheel of the present invention are assembled on the same wheel axle and can only make one-way rotation with respect to the axle. When the pedal is reciprocally rotated about the rotational shaft mounted on the frame, the driving linkage can drive the first flywheel and the second flywheel to rotate and then drive the wheel axle and the rear wheel to rotate, thereby converting the swing motion of the pedal into a forward driving force of the vehicle. Compared with the prior art, the invention is more comfortable and safe to use, and not only is suitable for both playing and fitness and but also suitable for a short-distance walk.

DETAILED DESCRIPTION OF PREFERRED EMBODIMENTS

To make the invention more apparent and easier to understand, reference is now made to the preferred embodiments and to the accompanying drawings as follows.

Figure 1:
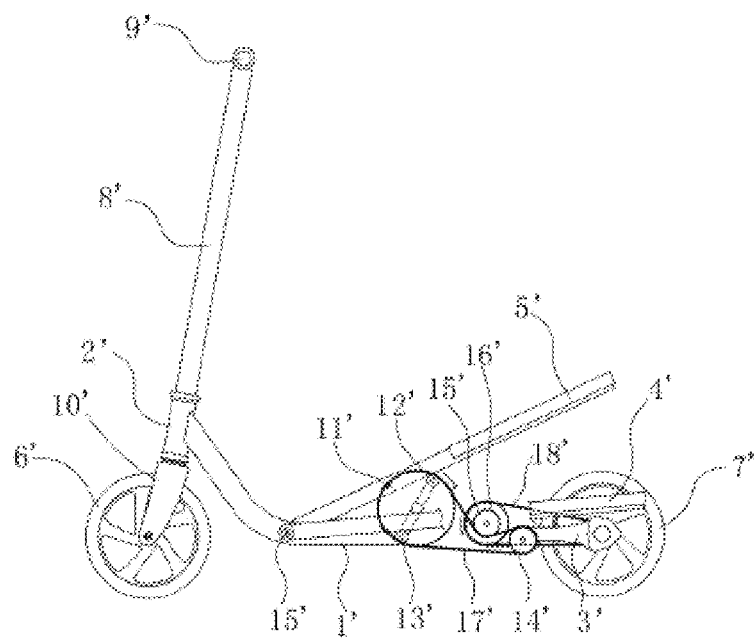
FIG. 1 is a schematic diagram of dual-pedal driven scooter driven by a dual pedal.

As shown in FIG. 1, there is shown an example of a dual-pedal driven scooter may include a frame 1', a faucet tube 2', a rear frame 3', a front fork 10', a front wheel 6', a rear wheel 7', a standpipe 8', a crossbar 9'. The faucet tube is located at the front end of the frame 1', and the rear frame 3' is located at the rear end of the frame 1'. The faucet tube 2' is provided with a front fork 10' looping through the faucet tube' 2' and being able to rotate in the faucet tube 2'. A front wheel 6' is provided on the front fork 10', and a rear wheel 7' is provided on the rear frame 3'. A left pedal 4' is provided on the left side of the frame 1', a right pedal 5' is provided on the right side of the frame 1', and one end of the left and right pedals 4', 5' is movably connected to the frame 1' through the pin. The frame 1' is provided with a first sprocket 11', a second sprocket 14', a third sprocket 15' and a fourth sprocket 16'. The left and right sides of the first sprocket 11' are provided with crank rollers 12', 13', respectively. The third sprocket 15' is connected to the fourth sprocket 16' via a wheel axle. The rear wheel 7' is provided with a flywheel. The first chain 17' loops around the first sprocket 11' and the second sprocket 14' and meshes with the third sprocket 15', and the second chain 18' loops around the fourth sprocket 16' and the flywheel.

The drive mode is as follows: when the user steps on the right pedal 5', the force is transmitted to the right crank roller 12', the right crank roller 12' drives the first sprocket 11' to rotate, and drives the second sprocket 14' and the third sprocket 15' to rotate, the third sprocket 15' drives the fourth sprocket 16' to rotate, the fourth sprocket 16' drives the flywheel to rotate, and the flywheel drives the rear wheel to rotate through the rear axle. In this way, the scooters are driven. When the right pedal is forced to the lowest point, the left pedal will be raised to the highest point by the left crank roller. At this time, the user will step on the left pedal, which is similar to the way the right pedal is driven, the left pedal transmits force to the left crank roller, which in turn drives a first gear, a second gear, a third gear, a fourth gear, the flywheel, and the rear wheel to rotate. With this reciprocating cycle, the continuous driving of the scooter can be realized.

The inventors found that the scooter with the above structure has the following disadvantages: 1) two sets of sprocket mechanisms are used to convert the clockwise rotation of the first sprocket to the counterclockwise rotation of the rear wheel, so that the structure of the drive device can be very complicated; 2) in order to obtain faster speeds of the scooters, the sprocket must be designed very large to amplify the movement of the pedal that the overall size and the weight of the entire drive device can be increased and the portability can be reduced; 3) in order to achieve continuous driving of the scooter, the foot applying force can't be switched until one of the pedals must be forced to the lowest point and the other one only at the highest point. Otherwise, the first sprocket will be causes to rotate in the opposite direction and unable to drive the rear wheel to advance, even cause the user to lose his/her balance and fall. The user's experience can be seriously affected.

Figure 2:
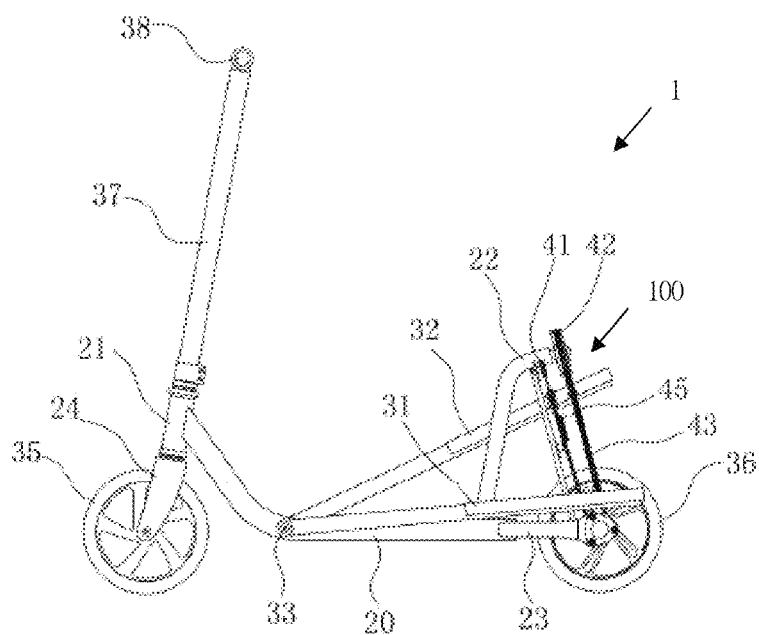
FIG. 2 is a front view of a dual-pedal driven scooter according to an embodiment of the present invention.

With reference to FIG. 2, the invention provides an embodiment of a novel scooter. The scooter 1 includes a frame 20 having a front end and a rear end, front wheels 35 and rear wheels 36 connected to the frame 20 respectively at the front end and the rear end, a driving mechanism 100 configured to drive the rear wheel 36 and in turn drive the scooter 1; and the pedals 31, 32 configured to drive the scooter 1; wherein the driving mechanism 100 has a driving linkage 43 linked with the pedals 31, 32 and the rear wheel 36. The pedals 31, 32 are fixedly connected to the driving linkage 43, so that the rear wheel 36 can be driven by pulling the driving linkage 43.

Figure 3:
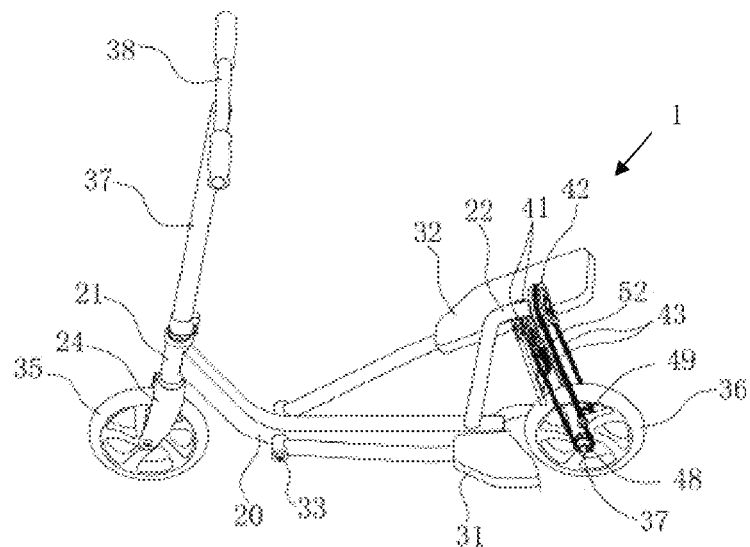
FIG. 3 is a top perspective view of the dual-pedal driven scooter of FIG. 2.

As shown in FIGS. 2 and 3, the pedal includes a left pedal 31 and a right pedal 32 located on both sides of the frame 20. The left pedal 31 and the right pedal 32 are pivotably connected to a portion of the frame near the front end, and are arranged to be pivotally movable between the highest point and the lowest point, and the left pedal 31 and the right pedal 32 are connected to a driving mechanism 100 of the rear end of the frame and configured to be driven by the driving mechanism 100 to each other. For example, the right pedal 32 shown in the figure is at the highest point and the left pedal 31 is at the lowest point.

Preferably, the driving linkage 43 is provided with connection points 46, 47 fixedly connected to the pedals 31, 32. When the scooter 1 is used by the user whose body's center of gravity is biased toward the right pedal 32 at a higher position, the right pedal 32 is pressed to the lowest point and drives the fixedly connected driving linkage 43 thereof, and the driving mechanism 100 transmits the kinetic energy to the rear wheels 36 to make it rotate while the left pedal 31 is driven back to the highest point by the driving linkage 43. At this time, the user can bias his body's center of gravity toward the left pedal 31 at a higher position to press the left pedal 31 down and transmit the kinetic energy to the rear wheel 36 with the driving linkage 43. The right pedal 32 are brought back to the highest point. As a result, the user can alternately bias his body's center of gravity and drive the rear wheels 36 through the driving mechanism 100 to repeatedly propel the scooter 1 forward.

Preferably, the driving mechanism 100 is fixedly connected to or near the rear end of the frame 20, and is provided between the left pedal 31 and the right pedal 32. The driving mechanism 100 has a driving linkage 43 that links the pedal and the rear wheel 36, so that power of the pedal can be transmitted to the rear wheel 36 through the driving linkage 43. The driving linkage 43 may be one section or may consist of multiple sections, which may include a belt, a chain, a rope, a cable, a cord, or any driving linkage for a drive/transmission mechanism. Different (section) driving linkages may be used to mate/engage different runner (groups) in the driving mechanism 100 such as sprocket, flywheel, and pulleys.

Figure 4:
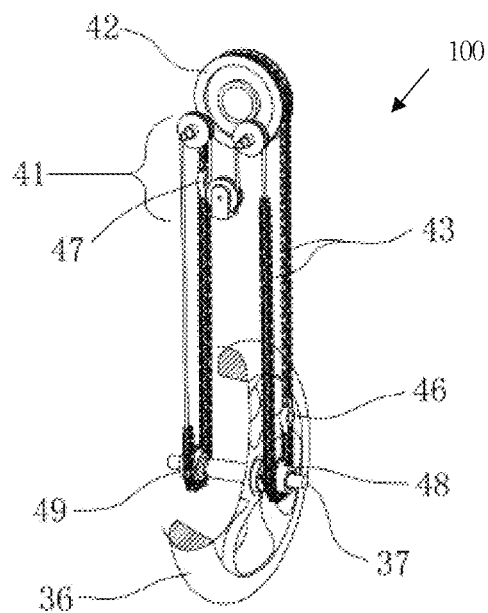
FIG. 4 is a perspective view of the drive mechanism of the scooter of FIG. 2.

With reference to FIG. 4, the driving mechanism also has a runner assembly. For example, the runner assembly may include a first flywheel 48 and a second flywheel 49 provided on the wheel axle 37 of the rear wheel 36 and configured to link the rear wheels 36. The first and second flywheels are preferably configured to engage a driving linkage 43 (eg, a chain) so that when the pedals 31, 32 are moved, the flywheels 48, 49 and the wheel axle 37 can be driven by the chain and the rear wheels 36 can be rotated. The driving mechanism 100 also has a one-way transmission assembly linked by a driving linkage 43, such as a one-way bearing or a ratchet. The first flywheel 48 and the second flywheel 49 may be provided on the left/right sides of the rear wheel 36, and the flywheels 48, 49 are connected to the wheel axle 37 through a one-way transmission assembly. The one-way transmission assembly can be configured to rotate unidirectionally with respect to the rear wheel 36, that is, the flywheels 48, 49 will only rotate clockwise or counterclockwise in a single direction with respect to the wheel axle 37 or the rear wheel 36 fixed to the wheel axle 37, i.e. the flywheel 48 and the flywheel 49 is rotatable in opposite directions with respect to each other, or it will be appreciated that the one-way transmission assembly will only engage with the wheel axle 37 when the flywheels 48, 49 rotate clockwise or counterclockwise in a single direction with respect to the rear wheel 36, and will transmit kinetic energy from the flywheels 48, 49 to the rear wheel 36. For example, the rear wheel 36 and the flywheels 48, 49 of the scooter 1 as shown in FIG. 2 can be configured to engage with the wheel axle 37 when the flywheels 48, 49 are driven by the driving linkage 43 and rotate counterclockwise with respect to the rear wheel 36. The kinetic energy is transmitted from the flywheels 48, 49 to the rear wheels 36. In contrast, when the flywheels 48, 49 are driven by the driving linkage 43 and rotate clockwise with respect to the rear wheels 36, or when the scooter 1 advances, the rear wheels 36 rotate counterclockwise and the flywheels 48, 49 stop rotating, the one-way drive assembly loosens the wheel axle 37 and allows the rear wheels 36 to continue counterclockwise rotation.

Preferably, the runner assembly further includes a first runner assembly 41 and a second runner assembly 42 provided above the rear wheel, the first runner assembly 41 and the second runner assembly 42 are fixed on the frame 20 slightly higher than the highest point where the pedals 31, 32 can be moved. The pedals 31, 32 may be fixed to the connection points 46, 47 between the first/second runner assemblies 41, 42, and the first/second flywheels 48, 49, and may reciprocatedly move between the first/second runner assemblies 41, 42 and the first/second flywheels 48, 49.

In the example of FIG. 4, the second runner assembly 42 includes a single runner, the diameter of which is approximately the same as the distance between the first flywheel 48 and the second flywheel 49. Preferably, the driving linkage 43 is configured to loop around the wheel assembly, sequentially looping around the first runner assembly 41, the first flywheel 48, the second runner assembly 42, the second flywheel 49 and then back to the first runner assembly 41. Since the driving linkage 43 including the chain sections is configured to loop around the runner assembly, the operation direction of the runner 42 is at right angles to the operation direction of the flywheels 48 and 49 on both sides of the rear wheel, so that the chain section looping around the runner 42 matches with the chain section looping around the flywheels 48, 49 on both sides of the rear wheel with a 90 degree turn. The different chain sections and the other sections of the driving linkage can be connected with the fittings. In addition, the pedals 31, 32 can be fixed to the connecting fittings, for example, fixedly connected by bolts/nuts or screws of connecting fittings. On the other hand, the first runner assembly 41 includes three runners configured to cooperate with a flexible rope looping around. Optionally, the first runner assembly 41 and the second runner assembly 42 may have different numbers and/or combinations of sprocket, flywheel, or pulleys to match the driving linkage looping around. For example, the runner may be configured to cooperate with the belt looping around, or it can be replaced with a sprocket to match the chain section looping around.

As shown in FIG. 2 and FIG. 3, the invention provides an embodiment of a dual-pedal driven scooter 1, wherein the scooter 1 includes a frame 20, a left pedal 31, a right pedal 32 and a first runner assembly 41, the second runner assembly 42, the first flywheel 48, the second flywheel 49, the wheel axle 37, and the driving linkage 43. The left pedal 31 and the right pedal 32 are connected to the frame 20 through a pedal shaft 33, and the left and right pedals can rotate within a certain range with respect to the frame 20. Above the rear portion of the frame is provided a first runner assembly 41 and a second runner assembly 42. A rear wheel 36 is connected to a rear portion of the frame, a front end of the frame 20 is connected to a faucet tube 21, a front fork 24 is sleeved inside the faucet tube 21, and an upper end of the front fork 24 is connected to the horizontal handle 38 by a standpipe 27, and the lower end of the front fork 24 is connected with the front wheel 35, the wheel axle 37 is connected to rear wheel 36.

As shown in FIG. 4, the driving linkage 43 sequentially loops around the first runner assembly 41, the first flywheel 48, the second runner assembly 42, and the second flywheel 49 and returns to the first runner assembly 41.

Among them, the driving linkage 43 is composed of a flexible rope and/or a chain. The driving linkage 43 is connected to the left pedal 31 via a connecting point 46 between the first flywheel and the second runner assembly 42. The driving linkage 43 is connected to the right pedal 32 via a connecting point 47 between the second flywheel and the second runner assembly 42.

The first flywheel 48 and the second flywheel are both mounted on the wheel axle 37, and the first flywheel 48 and the second flywheel 49 are respectively located on both sides of the rear wheel. Both the first flywheel 48 and the second flywheel 49 can only rotate in one direction with respect to the wheel axle 37. That is, viewed from the left side of the scooter 1 to the right, the first flywheel 48 or the second flywheel 49 may rotate clockwise with respect to the wheel axle 37, and the wheel axle 37 will be held when the first flywheel 48 or the second flywheel 49 rotates counterclockwise which in turn drives the wheel axle 37 to rotate together.

Figure 5:
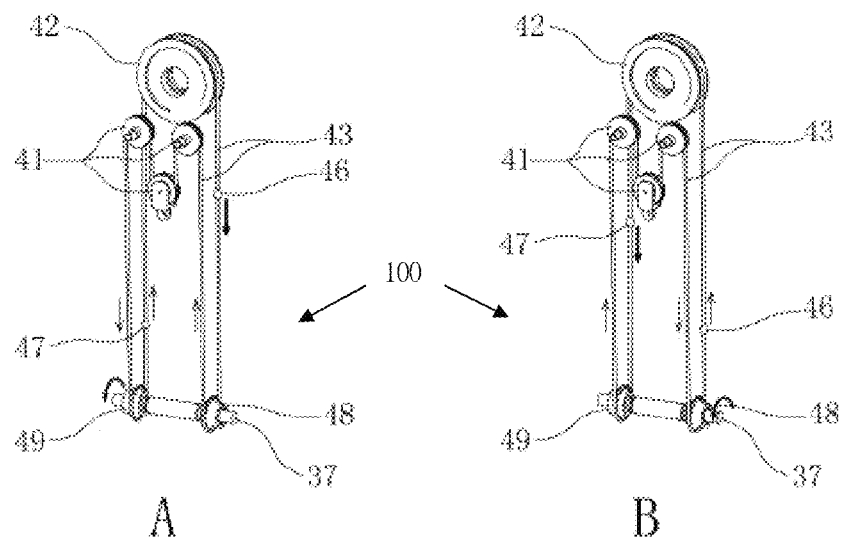
FIG. 5 is a schematic diagram of a drive mode of the scooter of FIG. 2.

As shown in FIG. 5-A, during riding, when the left pedal 31 is forced to move downwardly, the driving linkage 43 is driven to perform the movement as shown in the figure. The driving linkage 43 drives the first flywheel 48 to perform clockwise movement and drives the second flywheel 49 to perform counterclockwise movement. At this time, the second flywheel 49 engages the wheel axle 37 and in turn drives the rear wheel. At the same time, the driving linkage 43 will pull the right pedal 32 up to the highest point.

As shown in FIG. 5-B, when the right pedal 32 is forced to move downwardly, the driving linkage 43 is driven to perform the movement as shown in the figure. The driving linkage 43 drives the second flywheel 49 to perform clockwise movement, and drives the first flywheel 48 to perform counterclockwise movement. In this case, the first flywheel 48 engages the wheel axle 37 and drives the rear wheel. At the same time, the driving linkage 43 will pull the left pedal 31 up to the highest point.

The left pedal 31 and the right pedal 32 move reciprocatedly up and down so that the first flywheel 48 and the second flywheel 49 alternately drive the wheel axle 37 and the rear wheel 36, providing a constant power source for the scooter 1.

In order to achieve better performance of the scooter 1 according to the present invention, optionally, a set of springs 52 is provided on the first runner assembly 41 or the second runner assembly 42 for tensioning the driving linkage 43.

Figure 6:
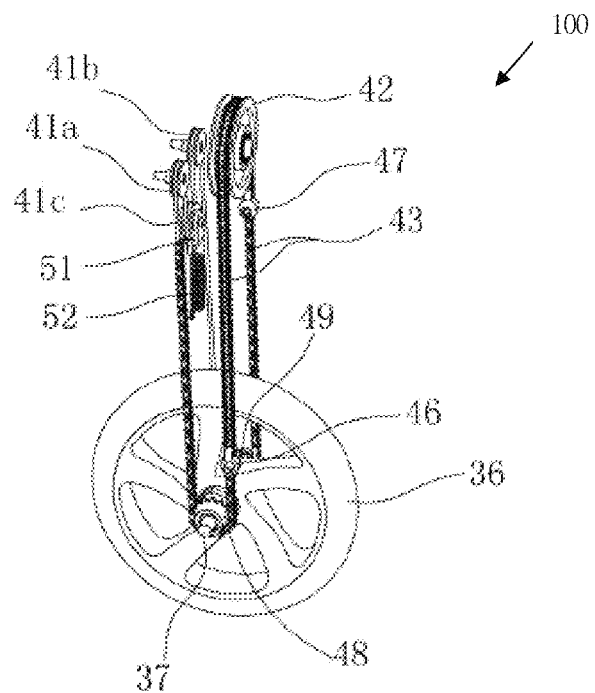
FIG. 6 is a perspective view of the drive mechanism of the scooter of FIG. 2.
Figure 7:
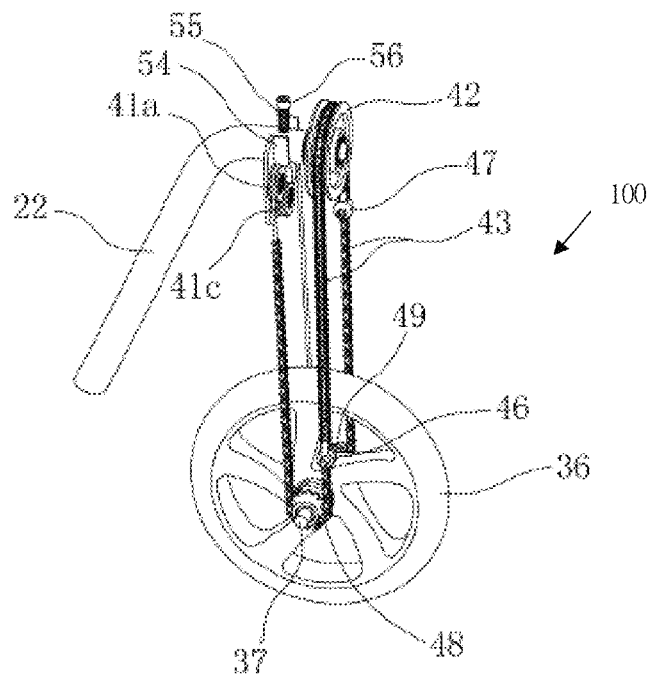
FIG. 7 is another perspective view of the drive mechanism of the scooter of FIG. 2.

With reference to FIGS. 6 and 7, the driving mechanism also has an elastic assembly such as a spring configured to tension the driving linkage. In the embodiment shown in FIG. 6, the runner 41a and the runner 41b are fixed to the frame 20, and the runner 41c is elastically connected to the frame by the spring 52, so that the driving linkage can be prevented from being loosened and detached from the runner assembly and the flywheel. The principle is shown in FIG. 9-G.

In the embodiment shown in FIG. 7, the runner assembly 41 is mounted on a runner bracket 54. The runner bracket 54 is elastically connected to the frame via a bracket shaft 56 and a spring 55. The principle is shown in FIG. 9-F.

Figure 8:
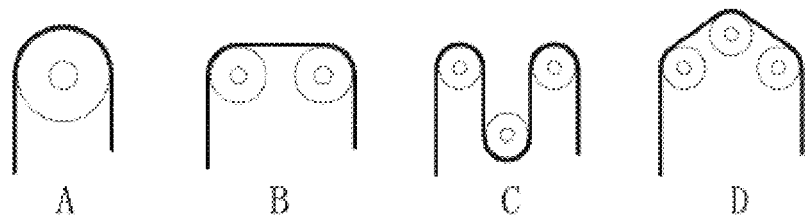
FIG. 8 is a schematic diagram of a configuration of a runner assembly according to an embodiment of the present invention.

Optionally, the first runner assembly 41 and the second runner assembly 42 may be composed of one or more runners. As shown in FIG. 8, the runner assembly may include a single larger wheel or two to three or even more wheels which are smaller runner assemblies, wherein the width of the runner assembly is preferably about the same as the distance between the first flywheel 48 and the second flywheel 49, so the driving mechanism can be located between the left pedal 31 and the right pedal 32. Each of the runner assembly can be composed of different runners, including sprockets, flywheels, or pulleys.

Figure 9:
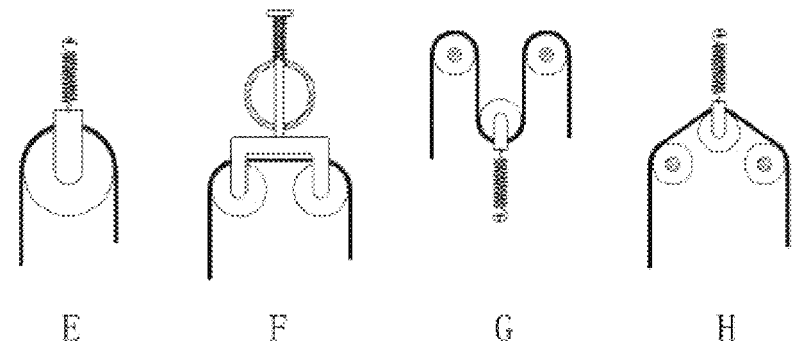
FIG. 9 is a schematic diagram of a runner assembly with a tensioning means according to an embodiment of the present invention.

FIGS. 8 and 9 merely illustrate several exemplary runner arrangements and the manner in which the driving linkages 43 are tensioned, but other similar runner arrangements can be used which should also fall within the scope of the present invention.

Therefore, after several embodiments have been described, those skilled in the art will recognize that various modifications, alternative constructions, and equivalents may be made without departing from the spirit of the invention. Accordingly, the above description should not be considered as limiting the scope of the invention as determined by the claims of this present invention.

What is claimed is:

1. A scooter, comprising:
  a frame with a front end and a rear end;
  a front wheel and a rear wheel respectively connected to the frame at the front end and the rear end;
  a driving mechanism configured to drive the rear wheel to in turn drive the scooter, the driving mechanism including:
    a runner assembly including a first flywheel and a second flywheel mounted on a wheel axle of the rear wheel,
    a first runner set, and
    a second runner set;
  a left pedal at a left side of the frame; and
  a right pedal at a right side of the frame, the left pedal and right pedal configured to drive the scooter;
  wherein the driving mechanism is provided between and is substantially perpendicular to the left pedal and the right pedal, such that the driving mechanism is parallel to the motion of the left pedal and right pedal,
  wherein the driving mechanism has a driving linkage that links the left pedal and the right pedal and the rear wheel, and the left pedal and right pedal are fixedly connected with the driving linkage so as to drive the rear wheel by pulling the driving linkage, and
  wherein the driving linkage forms a continuous loop that sequentially loops around the first runner set, the first flywheel, the second runner set, and the second flywheel and returns to the first runner set, such that, when the rear wheel is driven, the left pedal is further arranged to move the right pedal by pulling the driving linkage with the left pedal, and the right pedal is further arranged to move the left pedal by pulling the driving linkage with the right pedal.

2. The scooter according to claim 1, wherein the driving linkage is provided with at least one connecting point fixedly connected to each of the left pedal and the right pedal.

3. The scooter according to claim 1 wherein the driving mechanism is fixedly connected to or in proximity to the rear end of the frame.

4. The scooter according to claim 1, wherein the driving mechanism further comprises a one-way transmission assembly linked by the driving linkage, the one-way transmission assembly is configured to rotate unidirectionally with respect to the rear wheel.

5. The scooter according to claim 4, wherein the one-way transmission assembly includes a one-way bearing or a ratchet.

6. The scooter according to claim 1, wherein each of the first and second runner assemblies consists of one or more sprockets, flywheels or pulleys.

7. The scooter according to claim 1, wherein the driving mechanism further comprises an elastic member configured to tension the driving linkage.

8. The scooter according to claim 1, wherein the driving linkage is composed of an elastic rope or a chain.

9. A dual pedal-driven scooter, comprising:
  a frame connected to a left pedal and a right pedal;
  a front fork;
  a crossbar;
  a first runner assembly and a second runner assembly connected to the frame;
  a driving linkage forming a continuous loop that sequentially loops around a first runner assembly, a first flywheel, and a second runner assembly, a second flywheel and back to the first runner assembly, wherein the driving linkage is connected to the left pedal and the right pedal;
  a rear wheel connected to a rear end of the frame; and
  a faucet tube connected to a front end of the frame, wherein the faucet tube is sleeved with the front fork, and an upper end of the front fork is connected to the crossbar by a standpipe, and a lower end of the front fork is connected to the front wheel, wherein the first runner assembly and the second runner assembly are provided between and substantially perpendicular to the left pedal and the right pedal, such that the first runner assembly and the second runner assembly are parallel to the motion of the left pedal and right pedal, and the first flywheel and the second flywheel are mounted on a wheel axle of the rear wheel, such that, when the rear wheel is driven by the continuous loop of the driving linkage, the left pedal is further arranged to move the right pedal by pulling the driving linkage with the left pedal, and the right pedal is further arranged to move the left pedal by pulling the driving linkage with the right pedal.

10. The dual pedal-driven scooter according to claim 9, wherein each of the left pedal and the right pedal are connected to the frame by a pedal shaft.

11. The dual pedal-driven scooter according to claim 9, wherein the left pedal is connected to the driving linkage at a first connecting point between the first flywheel and the second runner set; and the right pedal is connected to the driving linkage at a second connecting point between the second flywheel and the second runner assembly.

12. The dual pedal-driven scooter according to claim 9, wherein the first flywheel and the second flywheel are arranged to rotate unidirectionally with respect to the rear wheel.

13. The dual pedal-driven scooter according to claim 9, wherein the first flywheel and the second flywheel are further arranged to rotate in opposite directions with respect to each other so as to drive the rear wheel to rotate unidirectionally.

\* \* \* \* \*